(12) United States Patent
Taniguchi et al.

(10) Patent No.: US 7,035,318 B2
(45) Date of Patent: Apr. 25, 2006

(54) RECEIVING UNIT AND SEMICONDUCTOR DEVICE

(75) Inventors: Shoji Taniguchi, Kawasaki (JP);
Koichi Kuroiwa, Kawasaki (JP);
Masami Kanasugi, Kawasaki (JP);
Yoshikazu Yamada, Kawasaki (JP);
Mahiro Hikita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 610 days.

(21) Appl. No.: 10/105,191

(22) Filed: Mar. 26, 2002

(65) Prior Publication Data

US 2003/0067965 A1    Apr. 10, 2003

(30) Foreign Application Priority Data

Oct. 5, 2001    (JP) .............................. 2001-310345

(51) Int. Cl.
*H04B 1/69* (2006.01)
*H04B 7/216* (2006.01)

(52) U.S. Cl. ....................................... 375/148; 370/335
(58) Field of Classification Search ................. 375/130, 375/144, 147, 148, 372, 141, 140, 371, 354; 370/335, 342, 441, 310, 431, 328, 329
See application file for complete search history.

(56) References Cited

U.S. PATENT DOCUMENTS

| 5,682,403 | A |   | 10/1997 | Tu et al. |   |
|---|---|---|---|---|---|
| 5,818,866 | A | * | 10/1998 | Wilk | 375/149 |
| 5,889,815 | A | * | 3/1999 | Iwakiri | 375/148 |
| 5,903,550 | A | * | 5/1999 | Spock | 370/335 |
| 2001/0022808 | A1 | * | 9/2001 | Komatsu | 375/148 |
| 2001/0036195 | A1 | * | 11/2001 | Garyantes et al. | 370/441 |
| 2002/0037027 | A1 | * | 3/2002 | Medlock et al. | 375/147 |

FOREIGN PATENT DOCUMENTS

EP    0998052    5/2000

OTHER PUBLICATIONS

European Search Report dated Oct. 19, 2004 issued in corresponding European Patent Application No. 02251992.0-1246-.

* cited by examiner

*Primary Examiner*—Tesfaldet Bocure
*Assistant Examiner*—Vineeta S. Panwalkar
(74) *Attorney, Agent, or Firm*—Staas & Halsey LLP (57) ABSTRACT

A receiving unit for receiving a CDMA system signal having a plurality of multipath components is intended to reduce the size. A receiving section receives a CDMA system signal. A storage section stores the signal received by the receiving section. A demodulation section demodulates each of multipath components included in the received signal stored in the storage section with a despreading code. A control section controls for demodulating a plurality of the multipath components by causing the demodulation section to perform a time division multiplex process. A Rake combining section performs the maximal ratio combining of output from the demodulation section to generate a demodulated signal.

4 Claims, 12 Drawing Sheets

RECEIVING UNIT AND SEMICONDUCTOR DEVICE

BACKGROUND OF THE INVENTION (1) Field of the Invention

This invention relates to a receiving unit and semiconductor device and, more particularly, to a receiving unit for receiving CDMA system signals having a plurality of multipath components and semiconductor device for processing CDMA system signals having a plurality of multipath components.

(2) Description of the Related Art

The code division multiple access (CDMA) system is a strong candidate for next generation mobile communication systems and cellular telephones in which this system is adopted are gradually spreading into the market.

With the CDMA system, sending information for users by spreading with spreading codes which differ among different users enables a plurality of users to communicate in the same frequency band at the same time.

By the way, there is the problem of multipath fading in mobile communication. If multipaths are generated, desired signals on each path will reach at different times and their strength will correspond to their arrival times. A desired signal which arrives at each time is a multipath component.

The Rake receiving system will improve the characteristics of the spread spectrum communication system in this multipath environment. With the Rake receiving system, multipath components are demodulated and combined if multipath fading has occurred.

Figure 10:
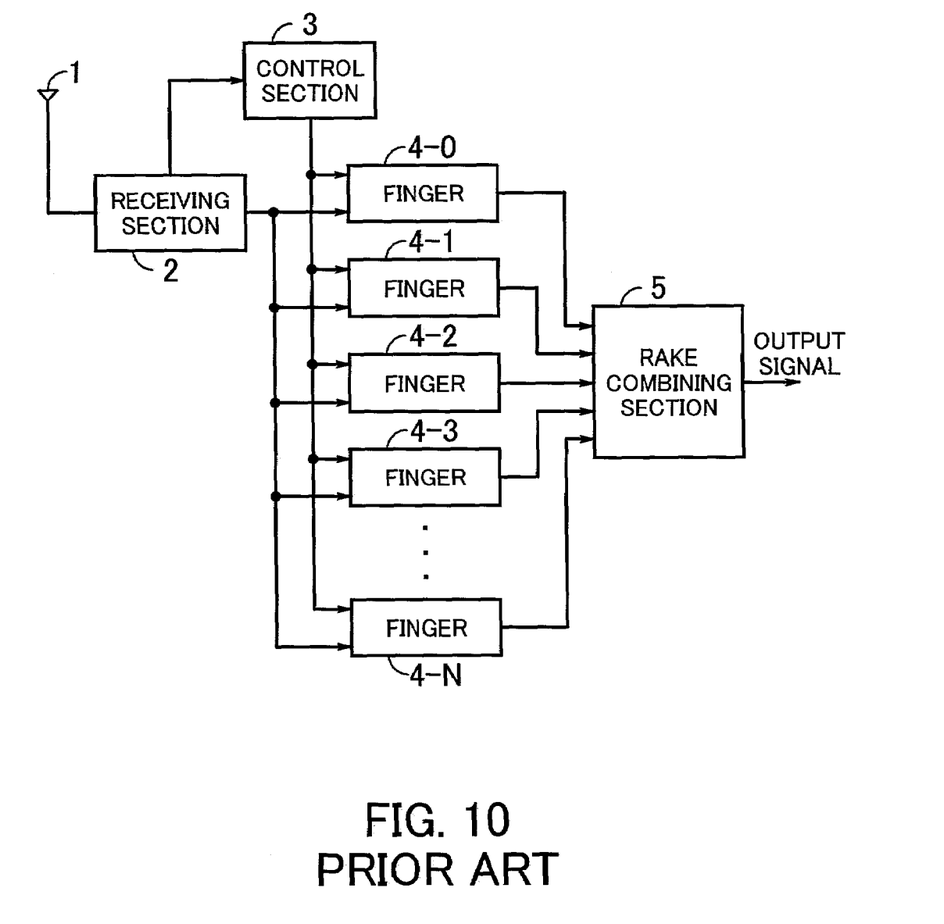
FIG. 10 is a block diagram showing the structure of a conventional receiving unit including a Rake combining section.

FIG. 10 is a block diagram showing the structure of a conventional receiving unit including a Rake combining section.

As shown in FIG. 10, a conventional receiving unit including a Rake combining section comprises an antenna 1, a receiving section 2, a control section 3, fingers 4-0 through 4-N, and a RAKE combining section 5.

The antenna 1 acquires electronic waves sent from a base station and supplies them to the receiving section 2.

The receiving section 2 converts electronic waves acquired by the antenna 1 into electrical signals and supplies them to the fingers 4-0 through 4-N.

The control section 3 calculates delay time for multipath signals and supplies signals indicative of the delay time to the fingers 4-0 through 4-N respectively.

Each of the fingers 4-0 through 4-N refers to a signal indicative of delay time, adjusts the phase of a spreading code for despreading a received signal, and demodulates a multipath component by despreading with this spreading code to obtain a desired signal.

The RAKE combining section 5 performs a time adjustment on desired signals output from the fingers 4-0 through 4-N and performs the maximal ratio combining of the signals to generate a demodulated signal.

Now, operation in the above conventional receiving unit will be described.

The antenna 1 acquires electronic waves which arrive from a base station via a plurality of paths (multipaths) and supplies them to the receiving section 2.

The receiving section 2 converts the received signal, being a radio frequency (RF) signal, into an intermediate frequency (IF) signal, generates, for example, 8-bit I and Q signals, and outputs them.

Figure 11:
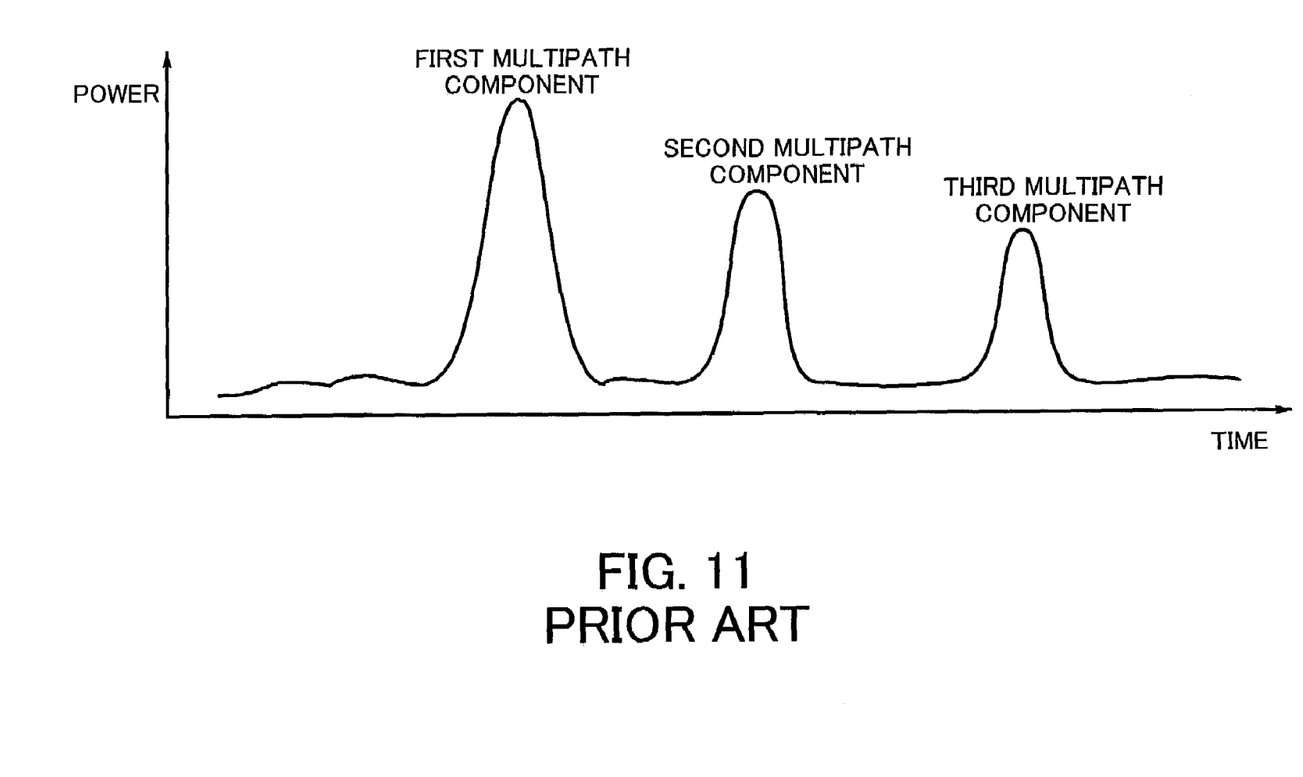
FIG. 11 is a view showing the relationship between the power of electronic waves which arrive from a base station via multipaths and time.

The electronic waves sent from the base station will arrive via the multipaths. Accordingly, as shown in FIG. 11, the received signal has a plurality of peaks. The control section 3 calculates delay time for multipath signals and supplies signals indicative of the delay time to the fingers 4-0 through 4-N respectively.

Each of the fingers 4-0 through 4-N refers to the signal indicative of delay time supplied from the control section 3, delays a despreading code by predetermined time, and performs despreading by multiplying the signal supplied from the receiving section 2 and the despreading code together.

The Rake combining section 5 performs a time adjustment on signals output from the fingers 4-0 through 4-N after the despreading and performs the maximal ratio combining of the signals to generate a demodulated signal.

As stated above, by using Rake combining, a plurality of peaks can be united into one, that is to say, scattered power can be combined. As a result, an S/N ratio will be improved.

As shown in FIG. 10, however, with conventional Rake receiving units, the number of fingers which need to be located correspond to that of multipaths, resulting in large-scale circuits.

Figure 12:
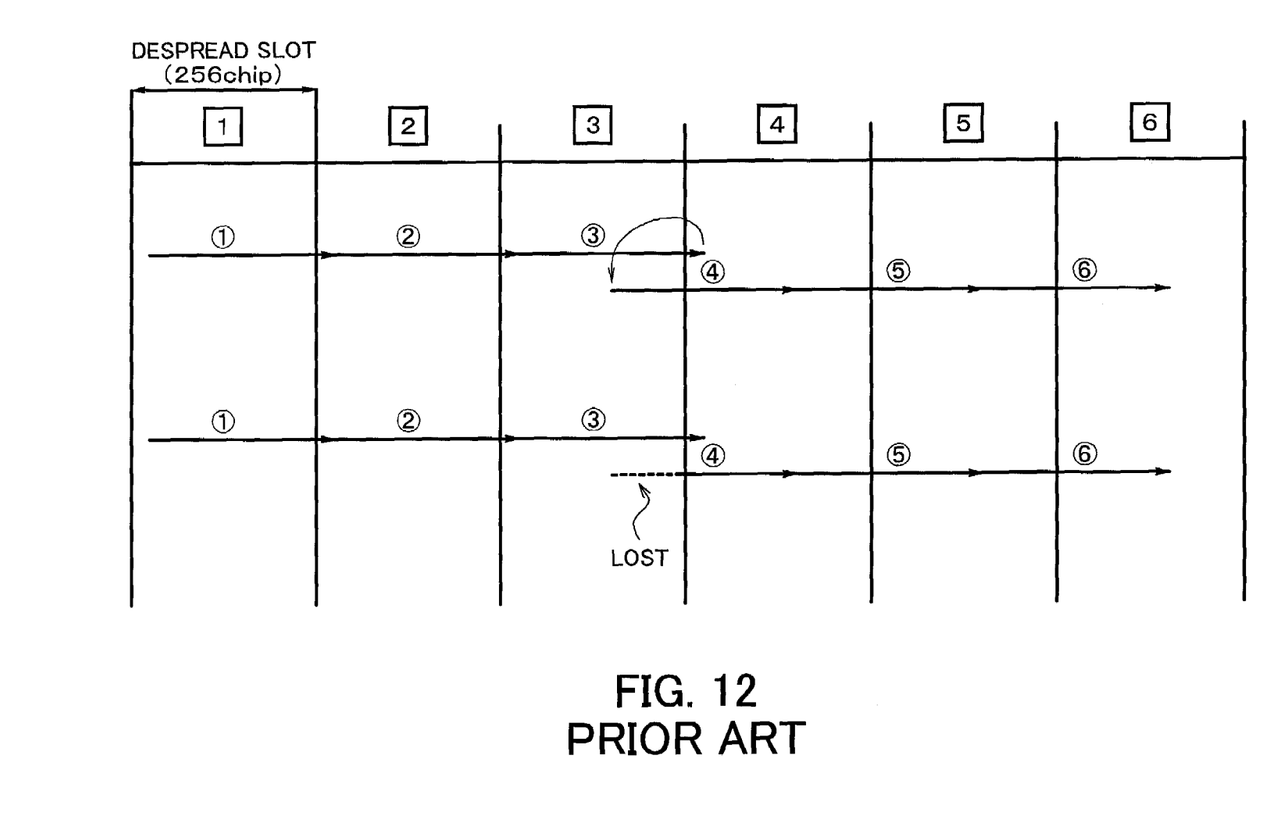
FIG. 12 is a view for describing a case where the timing of a received signal changes and is advanced significantly in a predetermined finger.

Moreover, as shown in FIG. 12, if the timing of a received signal changes and is advanced significantly in a predetermined finger, that portion of the signal will not be recovered correctly. In the worst case, a symbol will be lost.

For example, as a result of the movement of a receiving unit (or the movement of a reflection object which reflects electronic waves), a path on which a finger is performing despreading disappears and the same finger must perform despreading on another path component. In such a case, as shown in the third and fourth slots in FIG. 12, if a path component to be newly processed has already been received, that portion of a signal will be lost.

SUMMARY OF THE INVENTION

The present invention was made under the background circumstances as described above. An object of the present invention is to provide a receiving unit and semiconductor device which prevent the scale of circuits from increasing and which prevent a symbol from being lost.

In order to achieve the above object, a receiving unit for receiving CDMA system signals having a plurality of multipath components is provided. This receiving unit comprises a receiving section for receiving a CDMA system signal, a storage section for storing the signal received by the receiving section, a demodulation section for demodulating each of multipath components included in the received signal stored in the storage section with a despreading code, a control section for controlling for demodulating a plurality of the multipath components by causing the demodulation section to perform a time division multiplex process, and a Rake combining section for performing the maximal ratio combining of output from the demodulation section to generate a demodulated signal.

Furthermore, in order to achieve the above object, a semiconductor device for processing CDMA system signals having a plurality of multipath components is provided. This semiconductor device comprises a receiving section for receiving a CDMA system signal, a storage section for storing the signal received by the receiving section, a demodulation section for demodulating each of multipath components included in the CDMA system signal stored in the storage section with a despreading code, a control section for controlling for demodulating a plurality of the multipath components by causing the demodulation section to perform a time division multiplex process, and a Rake combining section for performing the maximal ratio combining of output from the demodulation section to generate a demodulated signal.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments of the present invention will now be described with reference to the drawings.

Figure 1:
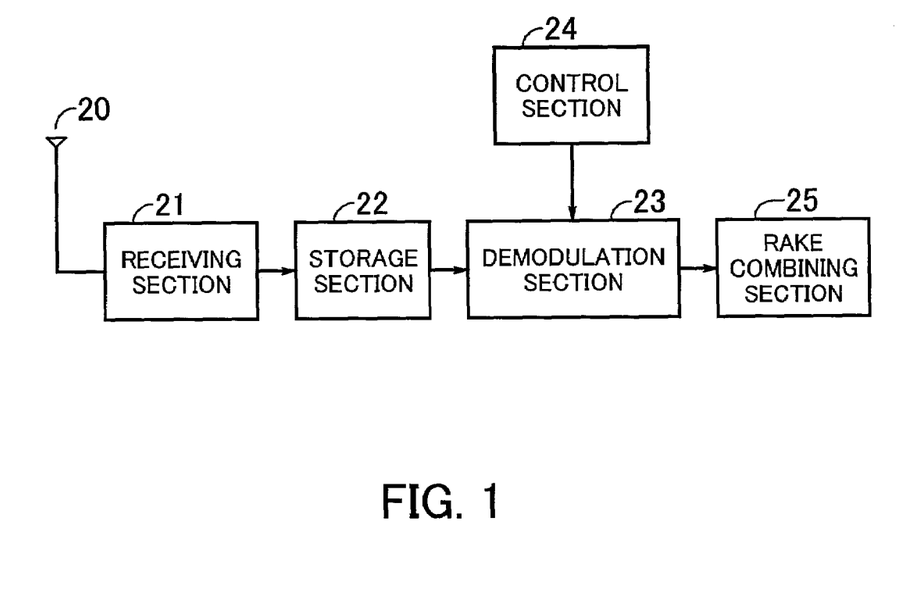
FIG. 1 is a view for describing the operative principles of the present invention.

FIG. 1 is a view for describing the operative principles of the present invention. As shown in FIG. 1, a receiving unit according to the present invention comprises an antenna 20, a receiving section 21, a storage section 22, a demodulation section 23, a control section 24, and a RAKE combining section 25.

The antenna 20 acquires electronic waves which arrive from a base station via multipaths.

The receiving section 21 converts a signal acquired by the antenna 20 into the corresponding electrical signal and outputs it.

The storage section 22 stores a signal received by the receiving section 21.

The demodulation section 23 demodulates each of multipath components included in a received signal stored in the storage section 22 with a despreading code.

The control section 24 controls for demodulating a plurality of the multipath components by causing the demodulation section 23 to perform a time division multiplex process.

The Rake combining section 25 performs the maximal ratio combining of output from the demodulation section 23 to generate a demodulated signal.

Now, operation in FIG. 1 will be described.

The antenna 20 acquires electronic waves which arrive from a base station via multipaths and supplies them to the receiving section 21.

The receiving section 21 converts the electronic waves acquired by the antenna 20 into the corresponding electrical signal, converts the electrical signal into a digital signal, and outputs the digital signal.

The storage section 22 is a ring buffer. The digital signal output from the receiving section 21 is stored in order at predetermined addresses in the storage section 22. After data is stored in all the areas, data will be stored again at the leading address and the same process will be repeated.

The demodulation section 23 reads data stored in the storage section 22 under the control of the control section 24. That is to say, the control section 24 informs the demodulation section 23 of a leading address at which each multipath component is stored. As a result, the demodulation section 23 can read each multipath component by reading predetermined data from the leading address of which the control section 24 informed the demodulation section 23. In that case, the demodulation section 23 will read data at a rate N times the rate at which writing from the receiving section 21 is performed. As a result, a single demodulation section 23 will have throughput equal to that of a total of N fingers. At the time of data being read, this can be realized by, for example, using a processing clock at a frequency N times the frequency of a processing clock used at the time of data being written into the storage section 22.

For example, it is assumed that data corresponding to a first, second, and third multipath component shown in FIG. 11 is stored from at the addresses "0001," "0012," and "0058," respectively, in the storage section 22. Then the control section 24 will supply the address values "0001," "0012," and "0058" to the demodulation section 23.

The demodulation section 23 reads a predetermined amount (one slot) of data from the address "0001" corresponding to the address value "0001" supplied from the control section 24 at a rate three times the write rate and multiplies the data and a despreading code together for demodulation.

Then the demodulation section 23 reads data from the address "0012" corresponding to the address value "0012" supplied from the control section 24 at a rate three times the write rate and multiplies the data and the despreading code together for demodulation. Similarly, the demodulation section 23 reads data from the address "0058" corresponding to the address value "0058" supplied from the control section 24 at a rate three times the write rate and multiplies the data and the despreading code together for demodulation.

As a result, three slots of data can be demodulated within time taken to write a slot of data from the receiving section 21.

The Rake combining section 25 performs a time adjustment on the data output in order by the slot from the demodulation section 23 after demodulation and performs the maximal ratio combining of the data to obtain a demodulated signal.

As described above, in a receiving unit according to the present invention, the time division multiplexing of a demodulation process is performed by writing a received signal once into the storage section 22, reading it at a rate higher than the write rate, and demodulating it by the demodulation section 23. Therefore, compared with the conventional receiving unit shown in FIG. 10, the scale of circuits can be reduced.

Now, an embodiment of the present invention will be described.

Figure 2:
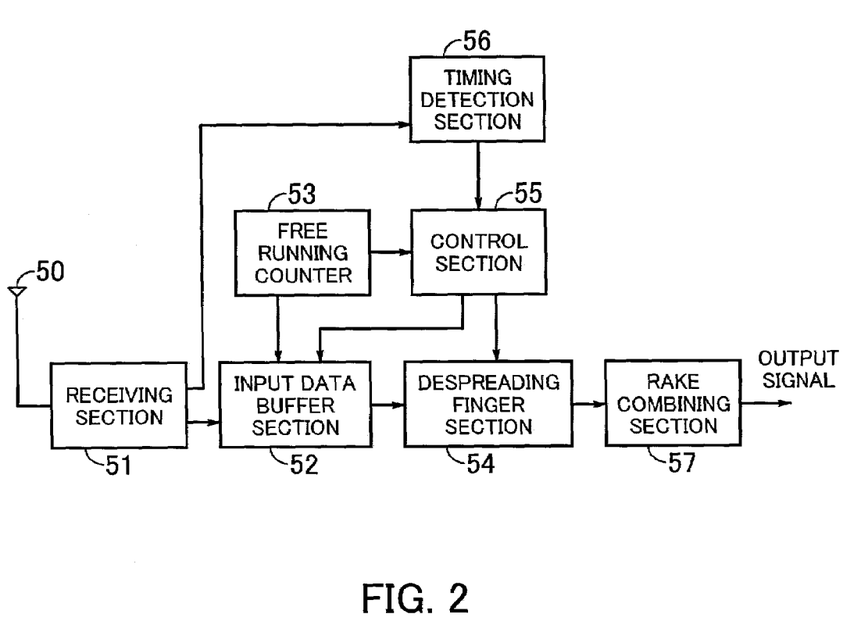
FIG. 2 is a view showing the structure of an embodiment of the present invention.

FIG. 2 is a view showing the structure of an embodiment of the present invention. As shown in FIG. 2, a receiving unit according to an embodiment of the present invention comprises an antenna 50, a receiving section 51, an input data buffer section 52, a free running counter 53, a despreading finger section 54, a control section 55, a timing detection section 56, and a RAKE combining section 57.

The antenna 50 acquires electronic waves which arrive from a base station via multipaths and supplies them to the receiving section 51.

The receiving section 51 receives a signal acquired by the antenna 50, converts the signal into the corresponding electrical signal, and outputs it.

As described later, in the input data buffer section 52, a plurality of RAMs form a ring buffer. The input data buffer section 52 stores data supplied from the receiving section 51 at an address specified by a count value supplied from the free running counter 53.

The free running counter 53 counts up a counter in a frame cycle and supplies a count value to the input data buffer section 52 and control section 55.

The despreading finger section 54 reads data by the slot from addresses in the input data buffer section 52 the head of which is specified by the control section 55, and multiplies the data and a despreading code together to demodulate a received signal.

The control section 55 controls over writing data to and reading data from the input data buffer section 52 and over the reading and despreading of data by the despreading finger section 54.

The timing detection section 56 refers to a received signal output from the receiving section 51, detects delay time for each multipath component, generates a timing signal, and supplies it to the control section 55.

The Rake combining section 57 performs the maximal ratio combining of output from the despreading finger section 54 to generate a demodulated signal.

Now, the detailed structure of each section will be described.

Figure 3:
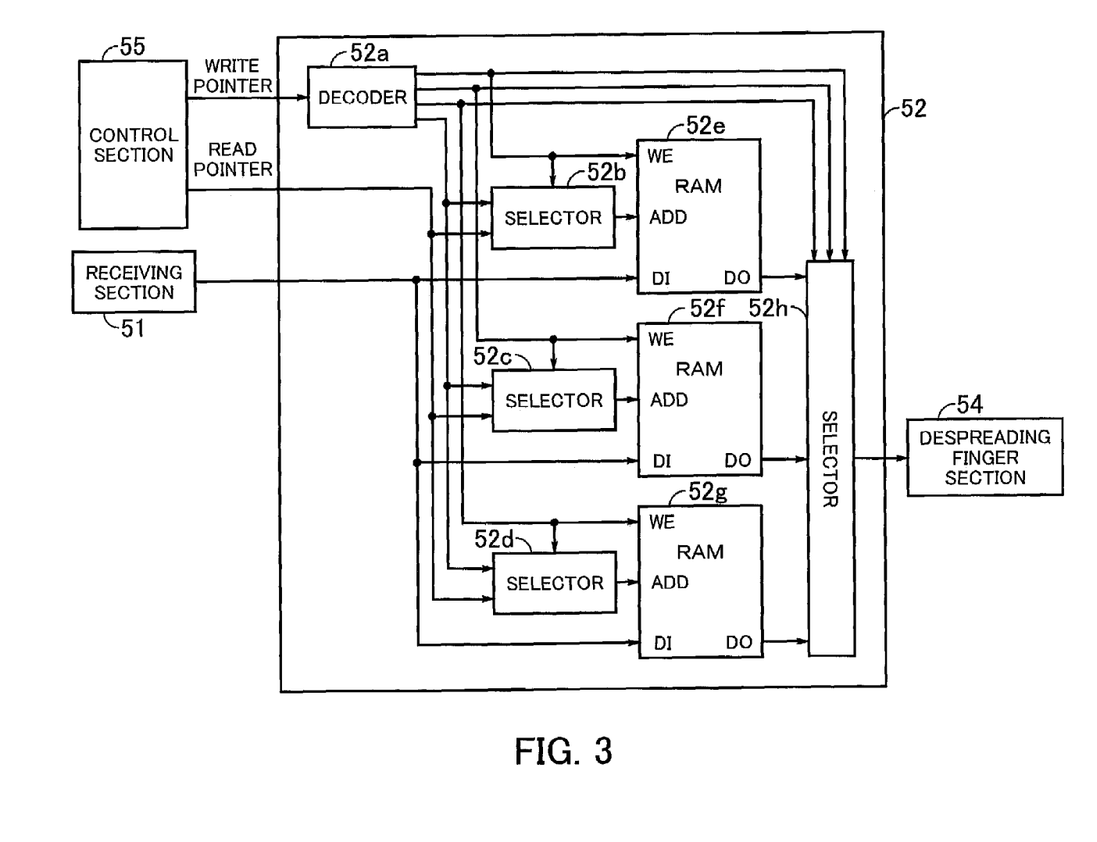
FIG. 3 is a view showing the detailed structure of the input data buffer section shown in FIG. 2.

FIG. 3 is a view showing the detailed structure of the input data buffer section 52 shown in FIG. 2. As shown in FIG. 3, the input data buffer section 52 includes a decoder 52a, selectors 52b through 52d, random access memories (RAMs) 52e through 52g, and a selector 52h.

The decoder 52a generates a write enable signal and write address from a write pointer supplied from the control section 55 by a decoding process and supplies them to the selectors 52b through 52d, selector 52h, and RAMs 52e through 52g.

If a write enable signal supplied from the decoder 52a is active, then the selector 52b selects an address signal supplied from the decoder 52a and supplies it to the RAM 52e. If a write enable signal supplied from the decoder 52a is not active, then the selector 52b selects a read pointer supplied from the control section 55 and supplies it to the RAM 52e.

If a write enable signal supplied from the decoder 52a is active, then the selector 52c selects an address signal supplied from the decoder 52a and supplies it to the RAM 52f. If a write enable signal supplied from the decoder 52a is not active, then the selector 52c selects a read pointer supplied from the control section 55 and supplies a read address to the RAM 52f. If a write enable signal supplied from the decoder 52a is active, then the selector 52d selects an address signal supplied from the decoder 52a and supplies it to the RAM 52g. If a write enable signal supplied from the decoder 52a is not active, then the selector 52d selects a read pointer supplied from the control section 55 and supplies a read address to the RAM 52g. A write enable signal is a signal for selecting only one RAM in which data is written, so one of write enable signals supplied to the RAMs 52e through 52g is active and the others are inactive.

If a write enable signal supplied from the decoder 52a is active, then the RAM 52e stores received data supplied from the receiving section 51 in a storage area corresponding to an address signal supplied from the selector 52b. If a write enable signal supplied from the decoder 52a is inactive, then the RAM 52e reads data from a storage area corresponding to an address signal supplied from the selector 52b and supplies it to the selector 52h.

If a write enable signal supplied from the decoder 52a is active, then the RAM 52f stores received data supplied from the receiving section 51 in a storage area corresponding to an address signal supplied from the selector 52c. If a write enable signal supplied from the decoder 52a is inactive, then the RAM 52f reads data from a storage area corresponding to an address signal supplied from the selector 52c and supplies it to the selector 52h.

If a write enable signal supplied from the decoder 52a is active, then the RAM 52g stores received data supplied from the receiving section 51 in a storage area corresponding to an address signal supplied from the selector 52d. If a write enable signal supplied from the decoder 52a is inactive, then the RAM 52g reads data from a storage area corresponding to an address signal supplied from the selector 52d and supplies it to the selector 52h.

The selector 52h selects a RAM where data will be read out of RAMs where a write enable signal supplied from the decoder 52a is inactive, and outputs data output from the RAM to the despreading finger section 54.

Figure 4:
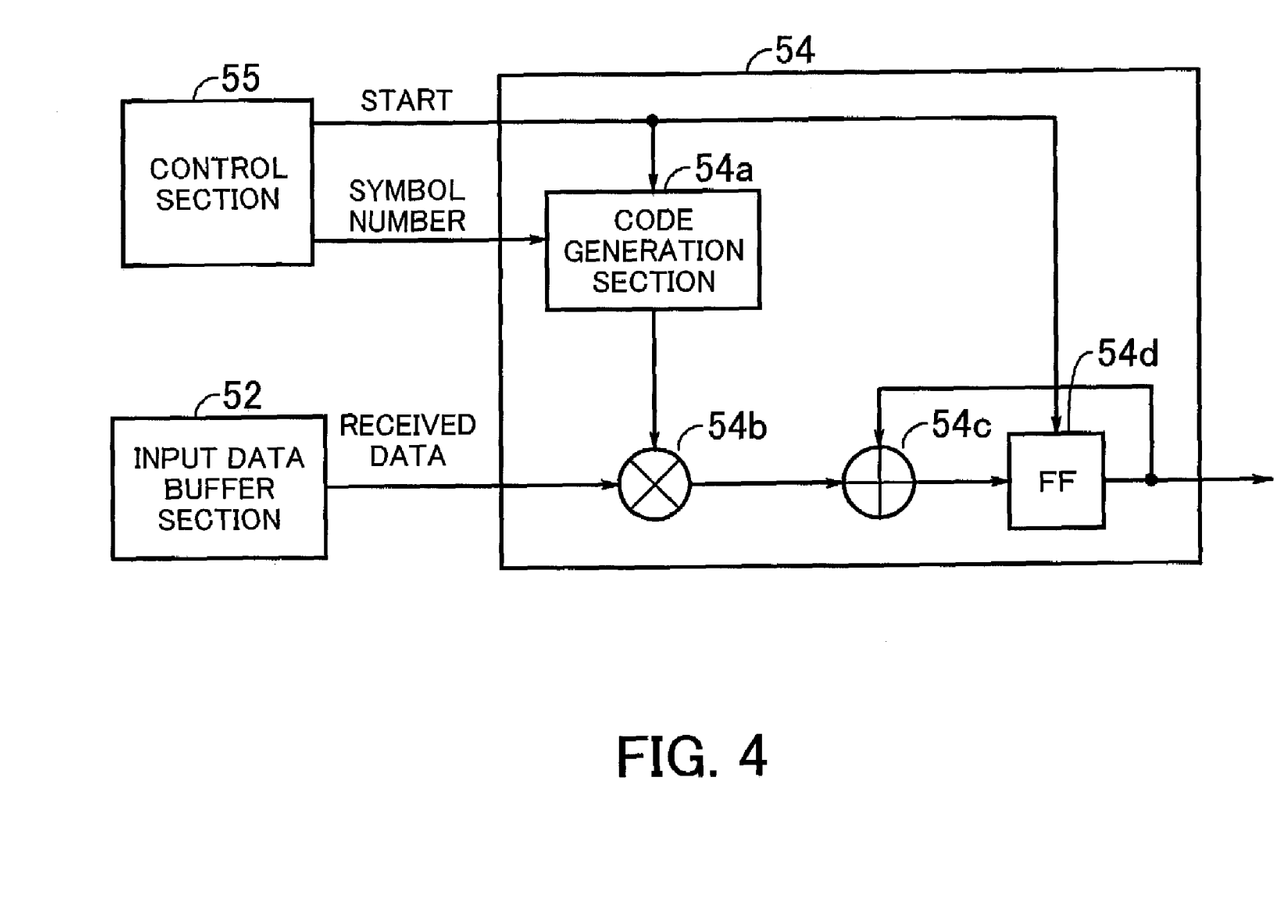
FIG. 4 is a view showing the detailed structure of the despreading finger section shown in FIG. 2.

FIG. 4 is a view showing the detailed structure of the despreading finger section 54 shown in FIG. 2. As shown in FIG. 4, the despreading finger section 54 includes a code generation section 54a, a multiplier 54b, an adder 54c, and a flip-flop (FF) circuit 54d.

The code generation section 54a generates a despreading code (obtained by adding a scrambling code and a channelization code together) corresponding to a symbol number supplied from the control section 55 in synchronization with a start signal supplied from the control section 55 and supplies it to the multiplier 54b.

The multiplier 54b sequentially multiplies a despreading code supplied from the code generation section 54a and received data read from the input data buffer section 52 together and outputs the result.

The adder 54c adds together the previous data stored in the FF circuit 54d and data output from the multiplier 54b and supplies the result to the FF circuit 54d.

The FF circuit 54d stores data supplied from the adder 54c.

Now, the detailed structure of the control section 55 will be described with reference to FIG. 5.

Figure 5:
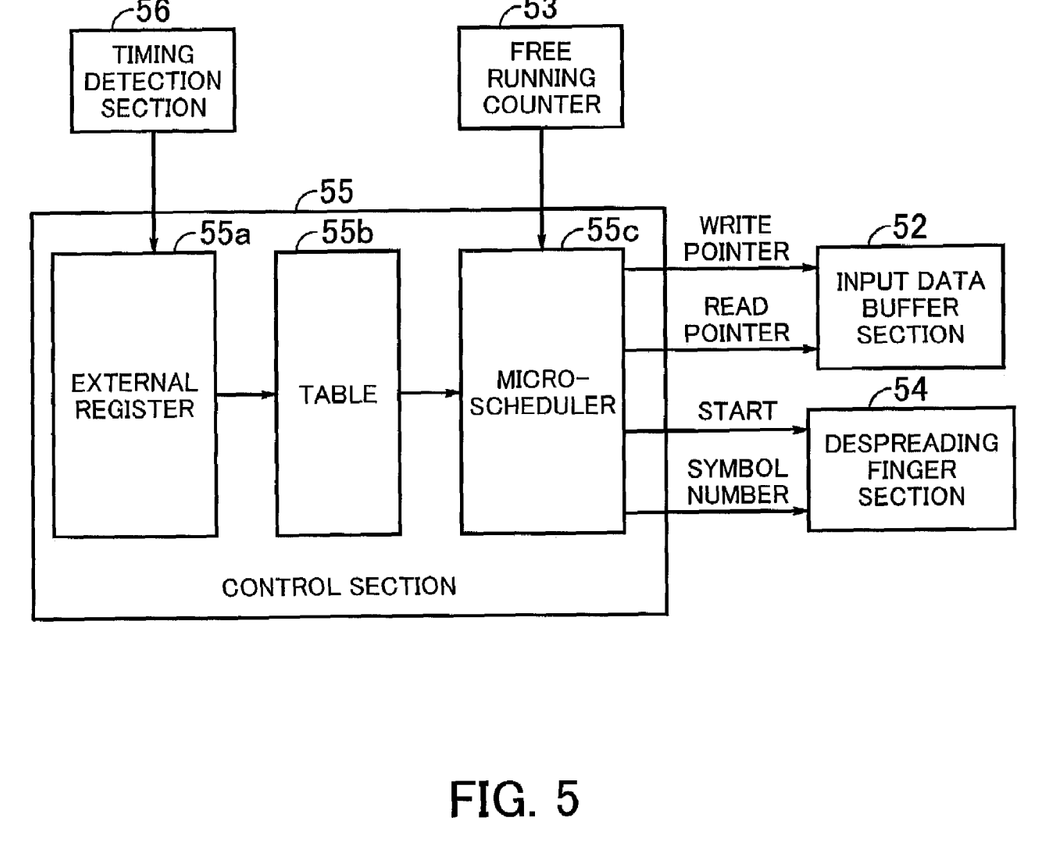
FIG. 5 is a view showing the detailed structure of the control section shown in FIG. 2.

As shown in FIG. 5, the control section 55 includes an external register 55a, a table 55b, and a microscheduler 55c.

The timing detection section 56 writes timing information regarding each multipath component into the external register 55a.

The table 55b functions as a buffer. The table 55b reads and stores timing information written into the external register 55a in a way that will not interfere with the write operation of the external register 55a.

The microscheduler 55c refers to a count value supplied from the free running counter 53 and generates a write pointer. Moreover, the microscheduler 55c generates a read pointer from a count value supplied from the free running counter 53 and timing information stored in the table 55b and supplies the read pointer to the input data buffer section 52.

Furthermore, the microscheduler 55c refers to a count value supplied from the free running counter 53, generates a start signal periodically, and supplies it to the despreading finger section 54. In addition, the microscheduler 55c generates a symbol number corresponding to each multipath component and supplies it to the despreading finger section 54.

Now, operation in the above embodiment will be described.

An overview of operation in the embodiment shown in FIG. 2 will be given first, then the details of the entire operation will be described.

Figure 6:
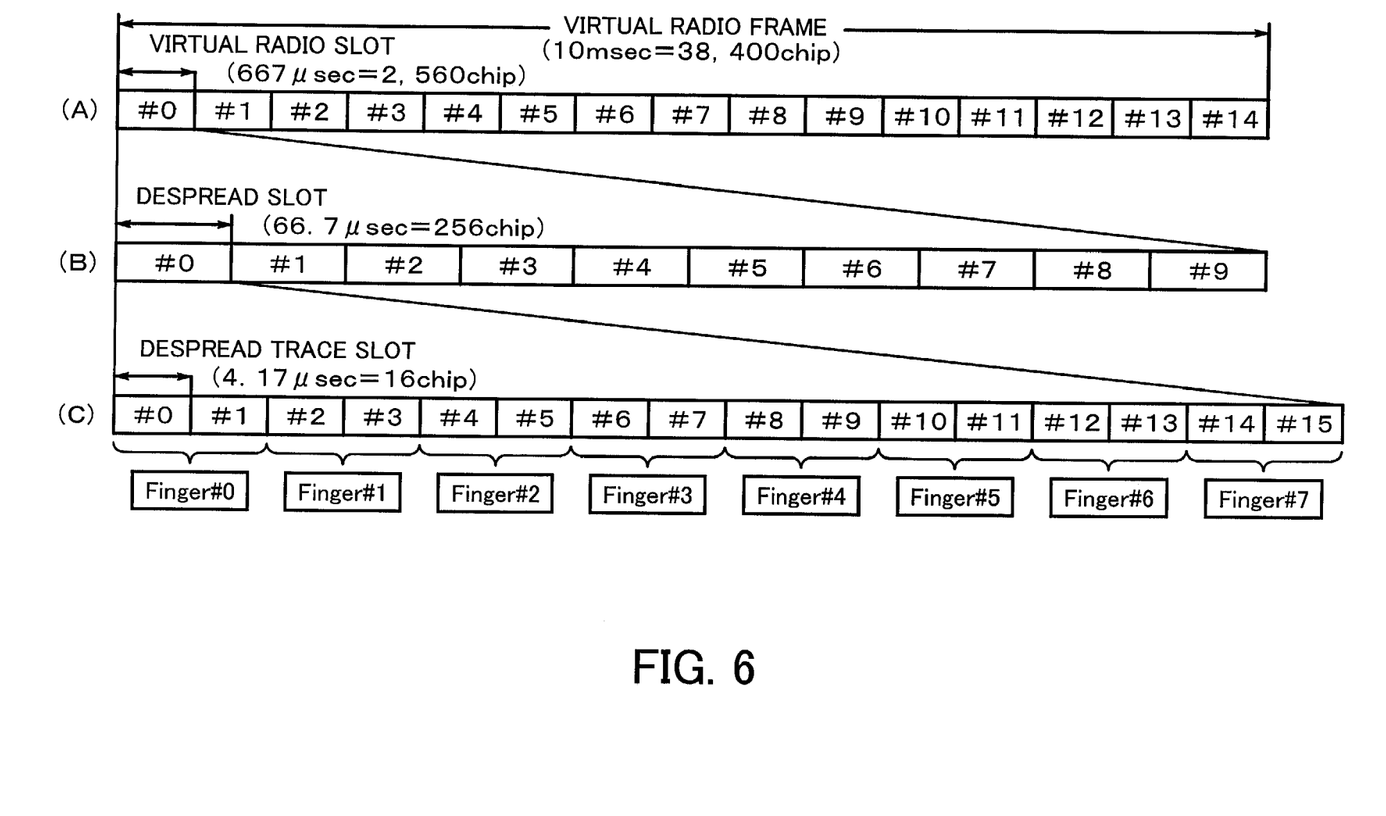
FIG. 6 is a view showing relationships among virtual radio slots, despread slots, and despread trace slots.

As shown in FIG. 6, in this embodiment, a received signal consists of a virtual radio frame of 38,400 chips (=10 msec). As shown in FIG. 6(A), this virtual radio frame consists of fifteen virtual radio slots each consisting of 2,560 chips (=667 μsec).

As shown in FIG. 6(B), each virtual radio slot consists of ten despread slots each consisting of 256 chips (=66.7 μsec).

With conventional receiving units, a plurality of fingers have performed despreading processes on despread slots at once in parallel. As shown in FIG. 6(C), in this embodiment, despreading processes are performed by dividing each despread slot into sixteen despread trace slots and by assigning two despread trace slots to one finger. That is to say, each finger operates on a time division basis and eight fingers practically operate.

In this case, the frequency of a processing clock for the despreading processes is set to a value sixteen times the frequency used in conventional receiving units.

Figure 7:
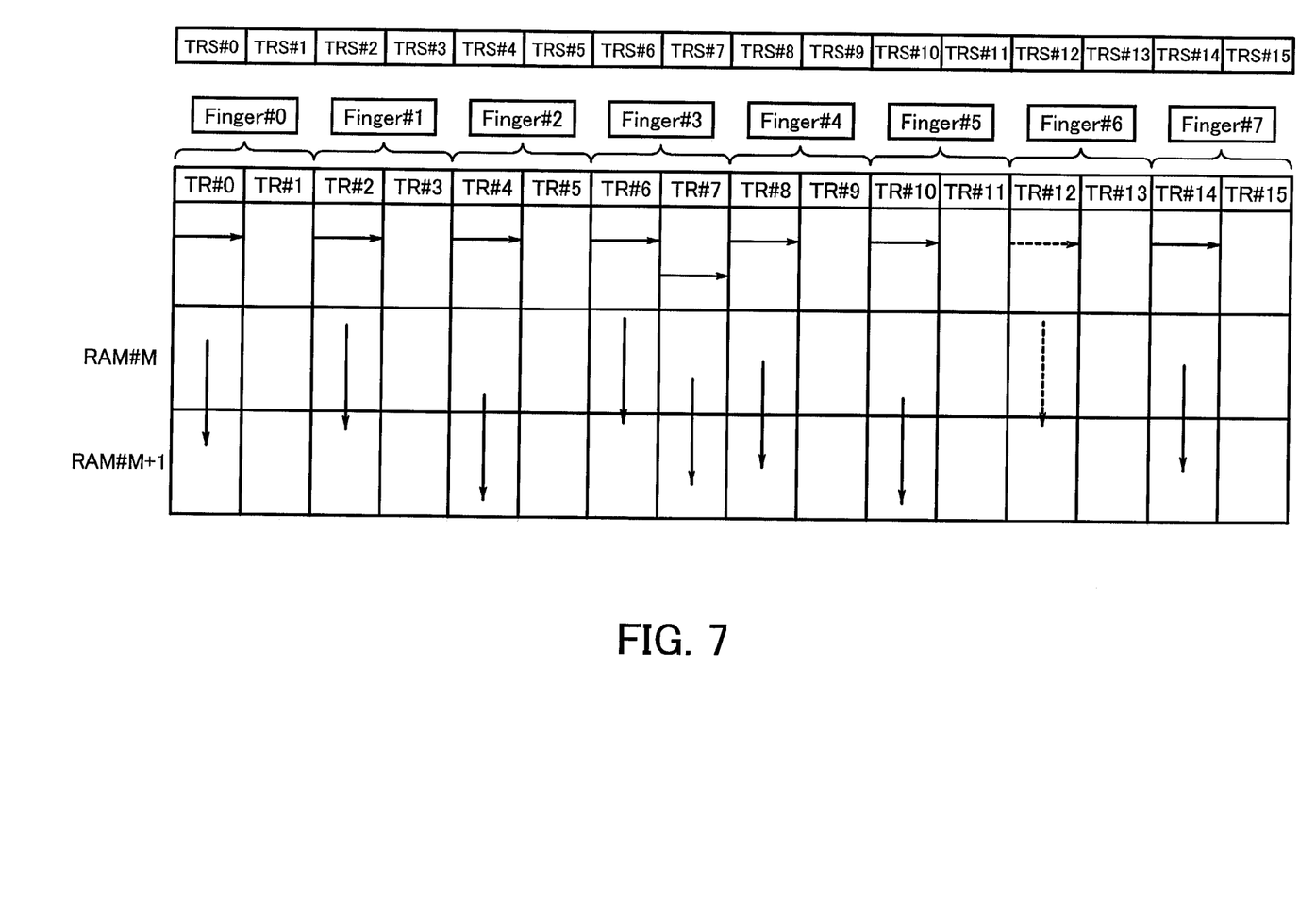
FIG. 7 is a view for describing the details of a process for preventing a symbol from being lost.

The total of the despread trace slots is sixteen, so there are eight too many to the eight fingers. As shown in FIG. 7, these surplus despread trace slots will be assigned to the process of preventing a symbol from being lost.

Now, detailed operation in the embodiment of the present invention will be described.

The antenna 50 acquires electronic waves which arrive from one or more base stations via multipaths. The receiving section 51 converts the electronic waves acquired by the antenna 50 into the corresponding electrical signal, converts the electrical signal into an intermediate frequency signal, converts the intermediate frequency signal into a digital signal, and supplies the digital signal to the input data buffer section 52 and timing detection section 56 as a received base band signal. The receiving section 51 performs fourfold oversampling on the received signal, so the receiving section 51 will output four times the amount of data it outputs in ordinary cases to the input data buffer section 52.

The input data buffer section 52 stores the data supplied from the receiving section 51 in the RAMs 52e through 52g shown in FIG. 3 in that order. When the RAM 52g becomes full, the input data buffer section 52 stores data in the RAM 52e again and repeats the operation of storing data in the same way. That is to say, the RAMs 52e through 52g will function as a ring buffer.

Now, the detailed operation of the input data buffer section 52 will be described. A write pointer is supplied first from the control section 55. This write pointer includes a write enable (WE) signal for selecting a RAM where data is written. This write enable signal is extracted by the decoder 52a and is supplied to the selectors 52b through 52d. If data is written into the RAM 52e, for example, a write enable signal connected to the RAM 52e out of write enable signals output from the decoder 52a becomes active and the other write enable signals become inactive.

When the write enable signal becomes active, data can be written into the RAM 52e. In this case, the write enable signal is also supplied to the selector 52b. When the write enable signal becomes active, the selector 52b selects an address signal output from the decoder 52a. As a result, the address signal output from the decoder 52a will be supplied to the RAM 52e.

The RAM 52e stores the data supplied from the receiving section 51 in a storage area specified by the address signal supplied from the selector 52b. This operation is repeated from the first address to the last address in the RAM 52e, so the RAM 52e will be filled with the data supplied from the receiving section 51.

As stated above, the receiving section 51 performs fourfold oversampling on the received signal and one chip is represented by one word (a despread slot consists of 256 chips). Therefore, a signal composing a despread slot is stored in the RAM 52e as 1024 words of data.

If the RAM 52e becomes full, then data will be written into the RAM 52f. The received data is stored in order in the RAM 52f by the same operation as described above.

If the RAM 52f becomes full, then the RAM 52g will be selected as one where data can be written and data will be written into the RAM 52g. At this time data previously received is stored in the RAMs 52e and 52f. The RAM 52e or 52f therefore will be selected as one where data can be read. Data is read with a read pointer supplied from the control section 55 as a leading address and is supplied to the despreading finger section 54.

The details of read operation will now be described. The timing detection section 56 generates timing information regarding each multipath component, supplies the timing information to the external register 55a, and causes the external register 55a to store the timing information. The timing information regarding each multipath component stored in the external register 55a is stored once in the table 55b and then is read by the microscheduler 55c. The microscheduler 55c adds together the timing information and a count value output from the free running counter 53 to generate a read pointer. The read pointer generated in this way is supplied to the input data buffer section 52.

If data is written into the RAM 52g in the input data buffer section 52, for example, a write enable signal connected to the RAM 52g is active and the other write enable signals are inactive. The selector 52d therefore selects a write address signal supplied from the decoder 52a and supplies it to the RAM 52g. The selector 52b selects a read pointer supplied from the control section 55 and supplies a read address to the RAM 52e. Similarly, the selector 52c selects a read pointer supplied from the control section 55 and supplies a read address to the RAM 52f.

Both write enable signals connected to the RAMs 52e and 52f are inactive, so data can be read from the RAMs 52e and 52f. The RAMs 52e and 52f read data from a storage area corresponding to a read pointer supplied from the control section 55 and supplies the data to the selector 52h.

The selector 52h generates a signal for selecting a RAM where data is read from a write enable signal supplied from the decoder 52a, selects data output from one of the RAMs 52e through 52g on the basis of the signal, and supplies the data to the despreading finger section 54. In the above example, the write enable signal connected to the RAM 52g is active, so the selector 52h generates a signal for selecting data output from the RAM 52e, selects data output from the RAM 52e on the basis of this signal, and outputs the data to the despreading finger section 54. In this case, data is also output from the RAM 52f, but this data is not selected. As a result, the data output from the RAM 52f will be discarded.

Figure 8:
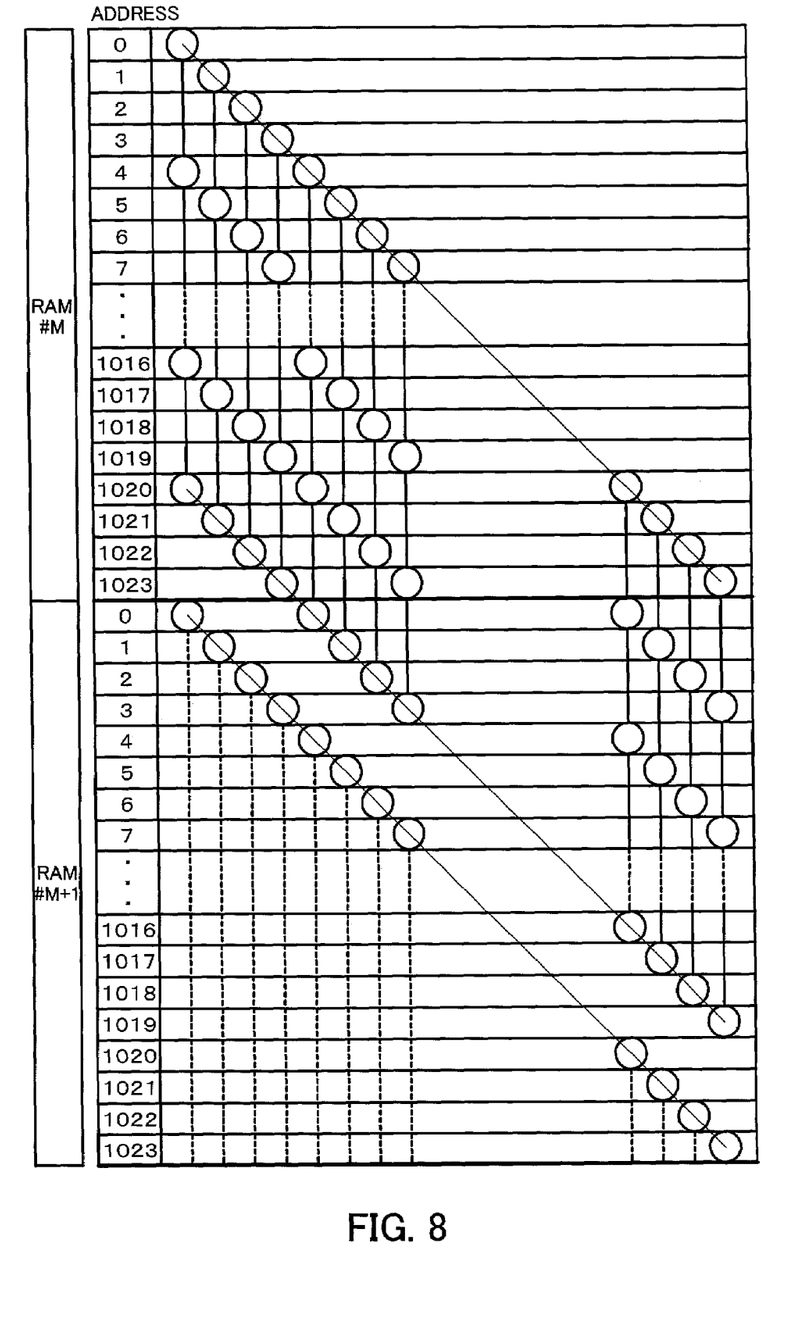
FIG. 8 is a view for describing how data is read from the input data buffer section shown in FIG. 2.

FIG. 8 is a view for describing how data is read from the input data buffer section 52. In FIG. 8, RAM #M corresponds to one the RAMs 52e through 52g shown in FIG. 3 and data will be read from the RAM #M and RAM #M+1 in that order. In this embodiment, M is smaller than or equal to three.

As shown in FIG. 8, data obtained by fourfold oversampling has been written into the RAMs 52e through 52g, that is to say, the RAMs 52e through 52g store four times the amount of data used on the read side. Therefore, in the case of reading, every fourth piece of data as shown by "o" in FIG. 8 is read to reduce the amount of the data. In FIG. 8, positions where data is read in the case of read start addresses being 0 through 1023 are indicated. To be concrete, if a read start address is, for example, 0, then data will be read from the addresses 0, 4, . . . , 1016, and 1020 in that order.

As shown in FIG. 7, in this embodiment, a despread slot is divided into sixteen despread trace slots and is processed. Therefore, data will be read from the RAMs 52e through 52g at a rate sixteen times the ordinary (conventional) rate. For example, the frequency of a processing clock at the time of data being read is sixteen times higher than that of a processing clock (ordinary processing clock) at the time of data being written. An ordinary despreading process will be performed on despread trace slots bearing even numbers (TR#0, TR#2, TR#4, . . . , and TR#14) included in data read in this way. A despreading process will be performed on despread trace slots bearing odd numbers (TR#1, TR#3, TR#5, . . . , and TR#15) only to make compensation for preventing a symbol from being lost.

Concrete operation will now be described. If the read start position of received data to be processed after a despread trace slot bearing an even number being read is given the same despread slot number, that is to say, if received data to be processed after a despread trace slot bearing an even number being read has been stored in a state shown in the TR#7 in FIG. 7, the data will be written into the RAM #M in the case of processing the next despread slot (data is now written into the RAM #M+2) and data which has been written into the RAM #M will be removed. In this embodiment, if there is such data, a despreading process is performed in a despread trace slot bearing an odd number to prevent data from being lost.

Performing data processing in this way in a despread trace slot bearing an odd number will obviate the need to perform a despreading process in the next despread slot. In that case, a process in the next despread trace slot bearing an even number will be canceled (see dashed lines in the TR#12 in FIG. 7). To judge whether to perform data processing in a despread trace slot bearing an even number, whether a read start position is given the same despread slot number should be judged.

As stated above, data read from the input data buffer section 52 is supplied to the despreading finger section 54 shown in FIG. 4 and a despreading process is performed there. That is to say, the despreading finger section 54 accepts data read by the input data buffer section 52 and supplies it to the multiplier 54b. The code generation section 54a has supplied a despreading code, which is obtained by adding a scrambling code and a channelization code together, corresponding to a symbol number supplied from the control section 55. The multiplier 54b sequentially multiplies the data read by the input data buffer section 52 and the despreading code supplied from the code generation section 54a together and outputs the result.

The adder 54c adds together the data output from the multiplier 54b and a value, which was obtained by the previous operation and which is stored in the FF 54d, and outputs the result. The FF 54d stores the operation result output from the adder 54c. As a result, the output from the FF 54d will be values obtained by integrating results obtained by multiplying the data read by the input data buffer section 52 and the despreading code supplied from the code generation section 54a together.

The values obtained in this way by the integration are supplied to the Rake combining section 57. The Rake combining section 57 performs the maximal ratio combining of the values to generate a demodulated signal.

As described above, in the embodiment of the present invention, the input data buffer section 52 is located between the receiving section 51 and the despreading finger section 54 and a time division multiplex process is performed in the despreading finger section 54 by setting a data read rate higher than a data write rate. This enables one despreading finger section 54 to play a role equal to a plurality of despreading finger sections. As a result, the scale of circuits can be reduced.

Moreover, in this embodiment, surplus despread trace slots are provided in the case of reading data from the input data buffer section 52 and a compensation process is performed in these surplus slots if necessary. This prevents a symbol from being lost.

In the above embodiment, a despread slot is divided into sixteen despread trace slots. However, it is a matter of course that the present invention is not limited to such a case.

Furthermore, the structure of the circuits shown in the above embodiment is a simple example and it is a matter of course that the present invention is not limited to such a case.

Now, another example of the structure of the despreading finger section 54 shown in FIG. 2 will be described.

Figure 9:
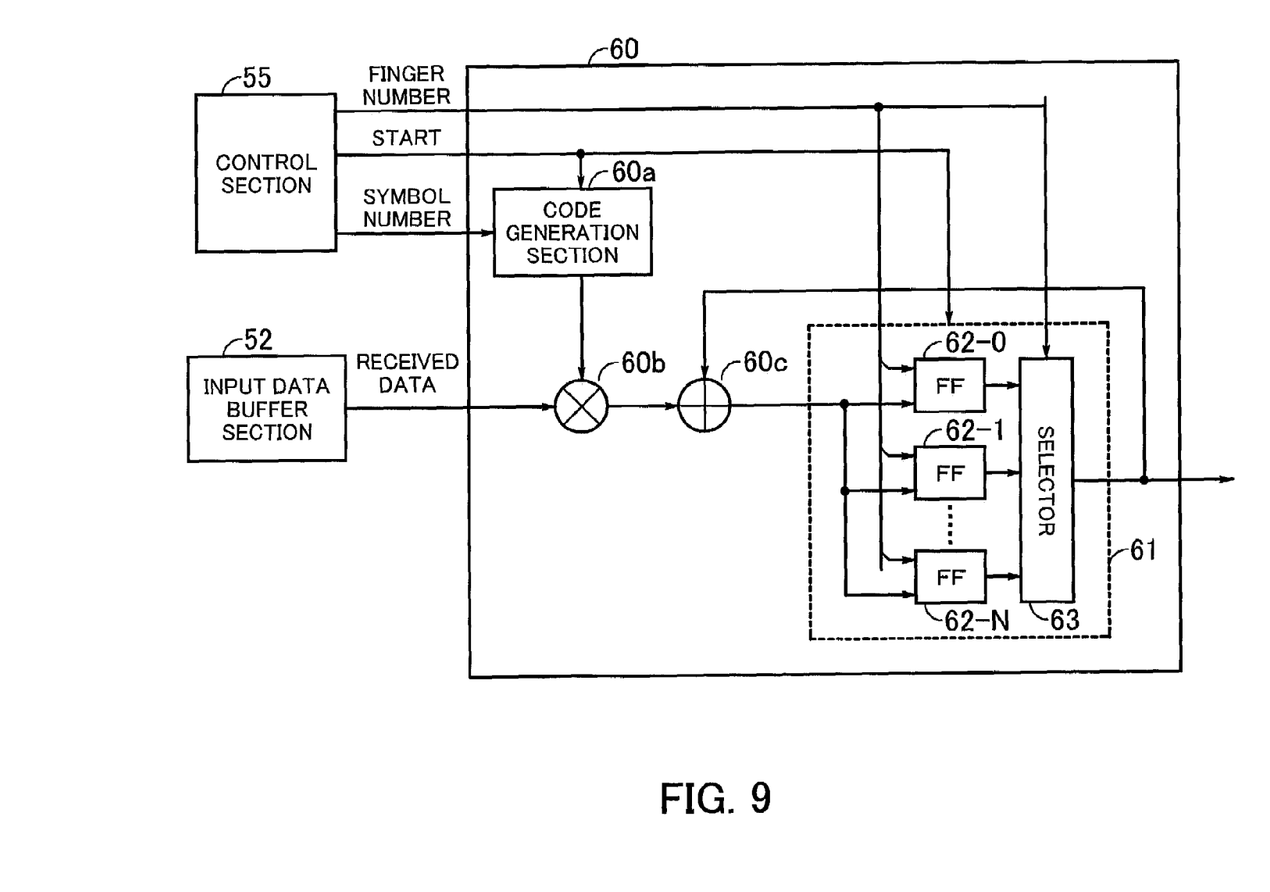
FIG. 9 is a view showing another example of the structure of the despreading finger section shown in FIG. 2.

FIG. 9 is a view showing another example of the structure of the despreading finger section 54 shown in FIG. 2. A despreading finger section 60 shown in FIG. 9 comprises a code generation section 60a, a multiplier 60b, an adder 60c, and a buffer section 61 including FF circuits 62-0 through 62-N and a selector 63.

When a start signal supplied from the control section 55 becomes active, the code generation section 60a generates a despreading code corresponding to a symbol number, which is obtained by adding a scrambling code and a channelization code together, and supplies it to the multiplier 60b.

The multiplier 60b sequentially multiplies data read by the input data buffer section 52 and a despreading code supplied from the code generation section 60a together and outputs the result.

The adder 60c adds together data output from the multiplier 60b and data stored in the buffer section 61 and supplies the result to the buffer section 61.

The buffer section 61 includes the FF circuits 62-0 through 62-N (N=7, in this embodiment), the number of which corresponds to that of the fingers, stores values obtained by integrating data corresponding to each finger, selects output from a predetermined FF circuit by the selector 63, and outputs it.

Now, the operation of the despreading finger section 60 will be described.

In this embodiment, the input data buffer section 52 reads data the amount of which is half of a slot shown in FIG. 6(B), that is to say, 128 chips of data and outputs it. When the reading of data corresponding to a first finger is begun, the selector 63 refers to a finger number supplied from the control section 55 and selects output from the FF circuit 62-0. Therefore, the 128 chips of data corresponding to the first finger and a despreading code are multiplied together and the obtained values are integrated. The result of the integration is stored in the FF circuit 62-0.

When the process for the first finger is completed, the selector 63 selects output from the FF circuit 62-1 and performs the same process as described above. Therefore, 128 chips of data corresponding to a second finger and the despreading code are multiplied together and the obtained values are integrated. The result of the integration is stored in the FF circuit 62-1.

The same process will be repeated eight times by the use of 128 chips of data corresponding to each of the first through (N+1)th fingers. The results of the eight processes are stored in the FF circuits 62-0 through 62-N respectively. When data corresponding to all the fingers is read in this way, the next data can be written into areas in the input data buffer section 52 where reading is completed.

Next, data corresponding to the second half of a despread slot is read by the 128 chips and a despreading process is performed on this data in the same way as described above. In the first process, for example, data corresponding to the first finger is read and is output. At this time the selector 63 in the despreading finger section 60 selects output from the FF circuit 62-0. The FF circuit 62-0 stores the result of the operation in which 128 chips of data corresponding to the first half of a despread slot was used, so the result of an operation in which the 128 chips of data corresponding to the second half of a despread slot is used will be added. As a result, the result of a despreading process on all the 256 chips of data composing a despread slot will be obtained.

When the process for the first finger is completed, the selector 63 selects output from the FF circuit 62-1 and performs the same process as described above. As a result, the result of a despreading process on data corresponding to the second finger will be obtained.

The same process will be performed on data corresponding to each of the second through (N+1)th fingers. As a result, the results of despreading processes on data corresponding to the first through (N+1)th fingers will be obtained.

In the above embodiment, data is read from the input data buffer section 52 by the 128 chips. Therefore, the storage capacity of the RAMs 52e through 52g included in the input data buffer section 52 can be reduced by half.

As has been described in the foregoing, a receiving unit for receiving CDMA system signals having a plurality of multipath components, according to the present invention, comprises a receiving section for receiving a CDMA system signal, a storage section for storing the signal received by the receiving section, a demodulation section for demodulating each of multipath components included in the received signal stored in the storage section with a despreading code, a control section for controlling for demodulating a plurality of the multipath components by causing the demodulation section to perform a time division multiplex process, and a Rake combining section for performing the maximal ratio combining of output from the demodulation section to generate a demodulated signal. This prevents a symbol from being lost.

Furthermore, a semiconductor device for processing CDMA system signals having a plurality of multipath components comprises a receiving section for receiving a CDMA system signal, a storage section for storing the signal received by the receiving section, a demodulation section for demodulating each of multipath components included in the CDMA system signal stored in the storage section with a despreading code, a control section for controlling for demodulating a plurality of the multipath components by causing the demodulation section to perform a time division multiplex process, and a Rake combining section for performing the maximal ratio combining of output from the demodulation section to generate a demodulated signal. This can reduce the size of semiconductor devices.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A receiving unit for receiving a CDMA system signal having a plurality of multipath components, the receiving unit comprising:
    a receiving section for receiving a CDMA system signal;
    a storage section for storing the signal received by the receiving section;
    a demodulation section for demodulating each of multipath components included in the received signal stored in the storage section with a despreading code;
    a control section to provide control for demodulating a plurality of the multipath components by causing the demodulation section to perform a time division multiplex process; and
    a Rake combining section for performing the maximal ratio combining of output from the demodulation section to generate a demodulated signal,
    wherein the demodulation section divides the timing with which the signal is read from the storage section into 2N time slots, assigns N of the 2N time slots to an ordinary despreading process, and assigns the remaining N time slots to a despreading process for preventing a symbol from being lost at the time of the variation in the timing of the received signal.

2. The receiving unit according to claim 1, wherein the demodulation section performs an M-fold multiplex process by setting the rate at which the signal is read from the storage section to N×M (M is a multiple of L), if the rate at which the signal is written into the storage section is given by N (=the speed of the received signal)×L (=the number of folds for oversampling).

3. A semiconductor device for processing CDMA system signals having a plurality of multipath components, the semiconductor device comprising:
    a receiving section for receiving a CDMA system signal;
    a storage section for storing the signal received by the receiving section;
    a demodulation section for demodulating each of multipath components included in the CDMA system signal stored in the storage section with a despreading code;
    a control section to provide control for demodulating a plurality of the multipath components by causing the demodulation section to perform a time division multiplex process; and
    a Rake combining section for performing the maximal ratio combining of output from the demodulation section to generate a demodulated signal,
    wherein the demodulation section divides the timing with which the signal is read from the storage section into 2N time slots, assigns N of the 2N time slots to an ordinary despreading process, and assigns the remaining N time slots to a despreading process for preventing a symbol from being lost at the time of variation in the timing of the received signal.

4. The semiconductor device according to claim 3, wherein the demodulation section performs an M-fold multiplex process by setting the rate at which the signal is read from the storage section to N×M (M is multiple of L), if the rate at which the signal is written into the storage section is given by N (=the speed of the received signal)×L (=the number of folds for oversampling).

* * * * *